United States Patent [19]
Dolengowski et al.

[11] Patent Number: 4,658,387
[45] Date of Patent: Apr. 14, 1987

[54] SHALLOW WATER SEISMIC ENERGY SOURCE

[75] Inventors: George A. Dolengowski, Stafford; D. Raymond Young, Houston, both of Tex.

[73] Assignee: Exxon Production Research Co., Houston, Tex.

[21] Appl. No.: 674,386

[22] Filed: Nov. 23, 1984

[51] Int. Cl.⁴ .......................... H04R 1/44; G01V 1/38
[52] U.S. Cl. ..................................... 367/144; 181/120
[58] Field of Search ............... 367/142, 144; 181/115, 181/118, 120, 104, 116, 117

[56] References Cited

U.S. PATENT DOCUMENTS

| | | | |
|---|---|---|---|
| 2,619,186 | 11/1952 | Carlisle | 181/115 |
| 3,276,534 | 10/1966 | Ewing et al. | 181/0.5 |
| 3,638,752 | 2/1972 | Wakefield | 181/0.5 |
| 3,653,460 | 4/1972 | Chelminski | 181/0.5 |
| 3,658,149 | 4/1972 | Neal et al. | 181/0.5 |
| 3,923,122 | 12/1975 | Itria | 181/115 |
| 4,006,794 | 2/1977 | Itria | 181/115 |
| 4,038,631 | 7/1977 | Murphy | 367/144 |
| 4,049,078 | 9/1977 | Paitson et al. | 181/120 |
| 4,141,431 | 2/1979 | Baird | 181/118 |
| 4,180,139 | 12/1979 | Walker | 181/120 |
| 4,193,472 | 3/1980 | Kirby | 181/118 |
| 4,211,300 | 7/1980 | Miller | 181/120 |
| 4,296,827 | 10/1981 | Thigpen et al. | 181/107 |
| 4,381,044 | 4/1983 | Kirby | 181/118 |

OTHER PUBLICATIONS

"External Sleeve—A New Air-Gun Approach", Jun., 1984, E. R. Harrison and L. M. Giacoma.
"Bolt ®-PAR ® Air Gun", Bolt Technology Corporation.

Primary Examiner—Deborah L. Kyle
Assistant Examiner—Ted L. Parr
Attorney, Agent, or Firm—Alfred A. Equitz; David H. Vickrey

[57] ABSTRACT

An apparatus and method for generating a shock wave in water comprising a housing capable of containing compressed gas, attachment means fastened to the housing by which the apparatus is oriented in a selected positioned and exhaust means in the housing positioned to release compressed gas in directions other than substantially upward. In a preferred embodiment, a commercially available compressed air gun is modified by blinding off the uppermost exhaust ports.

17 Claims, 6 Drawing Figures

SHALLOW WATER SEISMIC ENERGY SOURCE

FIELD OF THE INVENTION

This invention relates to an improved seismic energy source used to create pulses or shock waves in a liquid medium such as water. More particularly, it relates to a compressed gas seismic apparatus which is designed for operation in shallow water.

BACKGROUND OF THE INVENTION

In marine seismic exploration, a source of acoustic energy is released into the water periodically to produce appropriate sonic pulses or shock waves that propagate into the earth's surface beneath the water. These pulses propagate down through the water, across the marine floor, into the subfloor geologic formations and are reflected back as acoustic waves. An array of geophones, hydrophones or like equipment detect the reflected acoustic waves and convert such waves to electronic signals. These electronic signals are recorded for interpretation of the subsurface formation. Analysis of these electronic signals can provide an indication of the structure of the subfloor geological formation and attendant petroleum accumulation in those formations.

The term "water" as used herein is meant to include swamp water, mud, marsh water and any other liquid containing sufficient water to enable operation of the invention.

In one method of onshore seismic exploration, an underwater acoustic energy source is placed in a shallow water pit or mud pit used otherwise for routine drilling operations. Reflected sonic pulses generated by the underwater source may be detected by geophones placed on the ground. Alternately, geophones may be lowered down a nearby well. Reflected sonic pulses may also be detected by hydrophones in a water or mud pit.

There are many ways of generating a sonic pulse or wave in a liquid. For instance, explosives introduce strong pulses into the water and accordingly achieve substantial penetration into subfloor formations. Certain obvious drawbacks exist in their use. They can be dangerous to store, handle, and use. When used in open water they harm some marine life forms. In crowded areas, such as harbors, explosives cannot be used at all. Explosives are also expensive to use. Modification of the explosive source's sonic frequency spectrum of "signature" to achieve an acceptable spectrum distribution is difficult.

Another method of generating a sonic pulse is by discharge of a bank of capacitors through a subsurface electrode to produce a quickly collapsing implosive gaseous bubble. This method of sonic pulse generation is commonly used when high resolution response from near-surface geologic formations is desired. However, the efficiency of this method is low and only a small percentage of the energy charged to the capacitors is typically found in a shock wave produced on discharge.

Apparatuses using explosive gases (such as mixtures of propane and air or mixtures of propane and oxygen) to produce a sonic pulse on ignition have gained wide acceptance. The two major types of explosive gas guns are (1) those which operate by exploding a gas mixture behind a flexible membrane which in turn is in contact with the water and (2) those which operate by allowing the abrupt bubble from the gas explosion to pass directly into the water. An example of the former apparatus can be found in U.S. Pat. No. 3,658,149. An example of the latter can be found in U.S. Pat. No. 4,193,472.

Acoustic energy sources using high pressure compressed gases instead of an explosive mixture have also achieved a wide acceptance in the industry. Typical designs for open ported compressed gas guns are found in U.S. Pat. No. 3,653,460 to Chelminski and U.S. Pat. No. 4,141,431 to Baird. A typical compressed gas gun for marine seismic exploration comprises a housing which contains a chamber adapted to confine a charge of compressed gas at high pressure. The chamber is fitted with a valve. The valve is closed while the pressure is built-up in the chamber. When the gun is "fired", the valve is rapidly opened. This allows the compressed gas to expand out of the chamber and through exhaust ports in the housing into the surrounding medium to create an acoustic pulse.

Recently, a particular compressed gas gun, the air gun, has been a major marine seismic energy source. The typical air gun is of a configuration described above wherein the compressed high pressure gas is air. Currently, the compressed air in such guns is maintained at pressures between 2,000 and 6,000 psi prior to release in the water to create the desired acoustic wave.

State of the art air guns normally comprise a cylindrical housing containing symmetrically distributed exhaust ports through which the compressed gas is released when a valve is opened in the gun. The exhaust port configuration of these underwater compressed air guns may vary. In a common configuration, four exhaust ports are symmetrically distributed around the periphery of the cylindrical housing of the compressed gas gun. PAR ® Air Guns available from Bolt Technology Inc., Norwalk, Conn. are examples of air guns with four symmetrically distributed exhaust ports. In another configuration, compressed air is released through one 360° exhaust port about the periphery of the compressed gas gun. The external sleeve air gun designed by Geophysical Services Inc. of Dallas, Tex. is an example of an air gun with one 360° exhaust port. In an external sleeve air gun, a shuttle valve concentric with the gun housing slides along the outer surface of the housing to open and close a 360° exhaust port.

When a compressed gas gun is operated as a seismic source near the atmosphere-water interface, the bubble caused by the release of compressed gas can "blow-out". An above-surface "blow-out" occurs when a substantial portion of the released gas bubble expands into the atmosphere above the interface. These blow-outs can be partial or complete. When the bubble blows out, most of the gun's low frequency acoustic energy is lost to the atmosphere, rendering the source less desirable for deep seismic exploration.

As earlier discussed, common compressed gas guns (especially air guns) typically utilize several exhaust ports symmetrically spaced about the outer periphery of the gun body. Operation of a gun positioned horizontally will cause at least one of the ports to face the atmosphere-water interface. If the gun is operated in shallow water (usually less than ten feet), and is substantially charged, a partial or complete blow-out may occur from this near-surface port. This will cause the loss of acoustic energy rendering the seismic source inefficient for exploration.

SUMMARY OF THE INVENTION

The current invention is an apparatus and method for generating a shock wave in water comprising a housing capable of releasably containing compressed gas, attachment means fastened to the housing by which the apparatus is positioned in the water in a selected orientation and exhaust ports positioned in the housing so when compressed gas is released from the housing, the compressed gas escapes through the exhaust ports in directions other than substantially upward. In a preferred embodiment, compressed gas guns currently in use are modified by employing a unique device which blocks-off the exhaust means which would otherwise release gas in an upward direction. Alternatively, compressed gas guns without an upper exhaust means can be manufactured. In either case, methods employing the practice of the current invention require orienting the compressed gas gun in the water so that the portion of the gun which has blocked-off exhaust means or contains no upper exhaust means is oriented in a substantially upward direction toward the atmosphere-water interface.

DETAILED DESCRIPTION OF THE INVENTION

The preferred embodiment of the current invention is a conventional compressed gas gun with exhaust ports symmetrically distributed about the periphery of the gun which has been modified to provide a port blind-off device which substantially prevents discharge of compressed gas in an upward direction toward the atmosphere-water interface when the gun is in service underwater.

Figure 1:
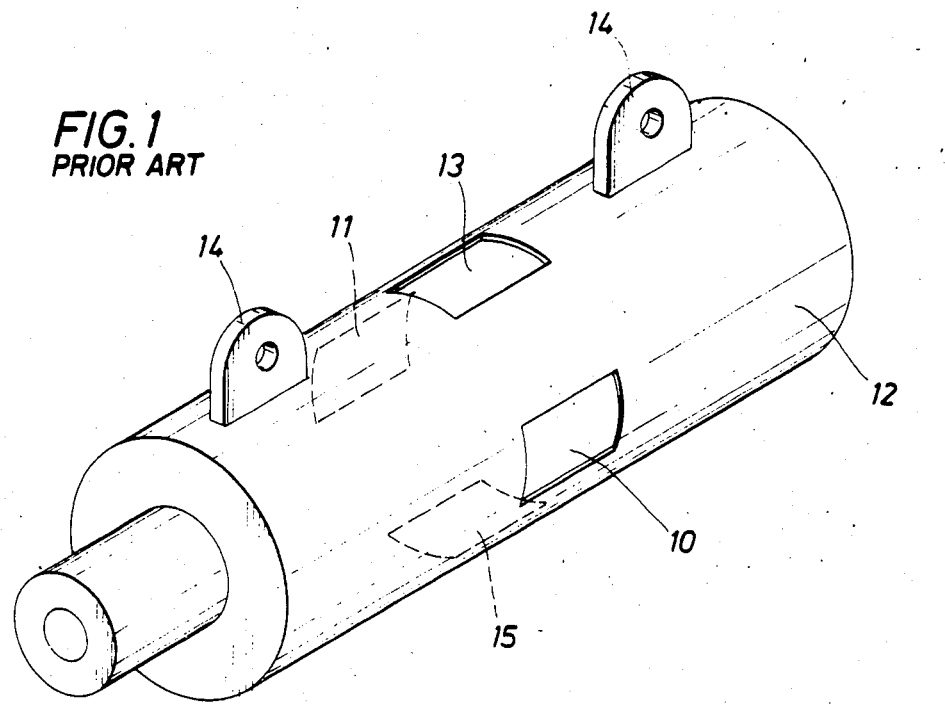
FIG. 1 is an isometric drawing of a typical compressed gas gun with exhaust ports symmetrically distributed about its periphery.
Figure 2:
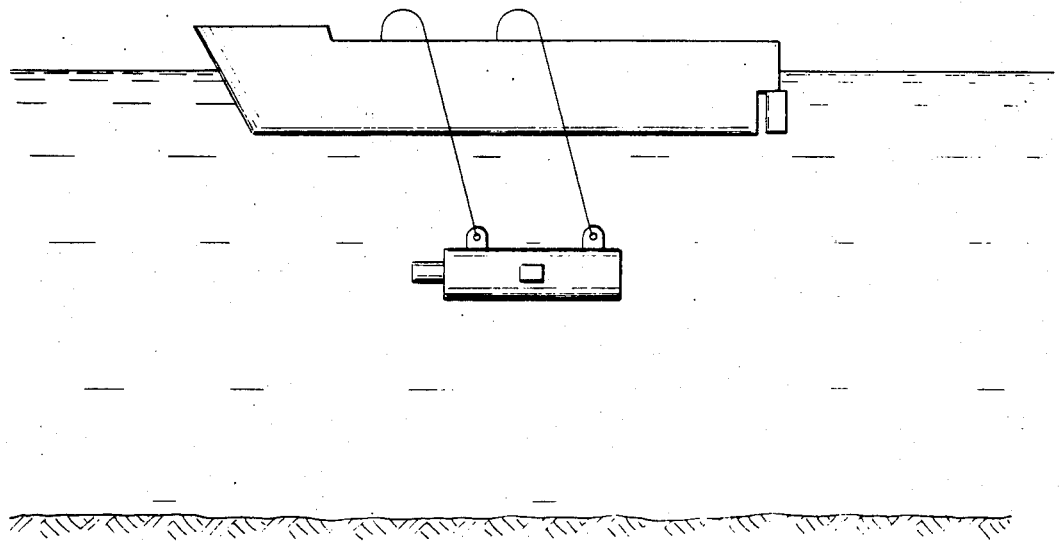
FIG. 2 is a representation of a compressed gas gun in shallow water oriented in accordance with the current invention.
Figure 6:
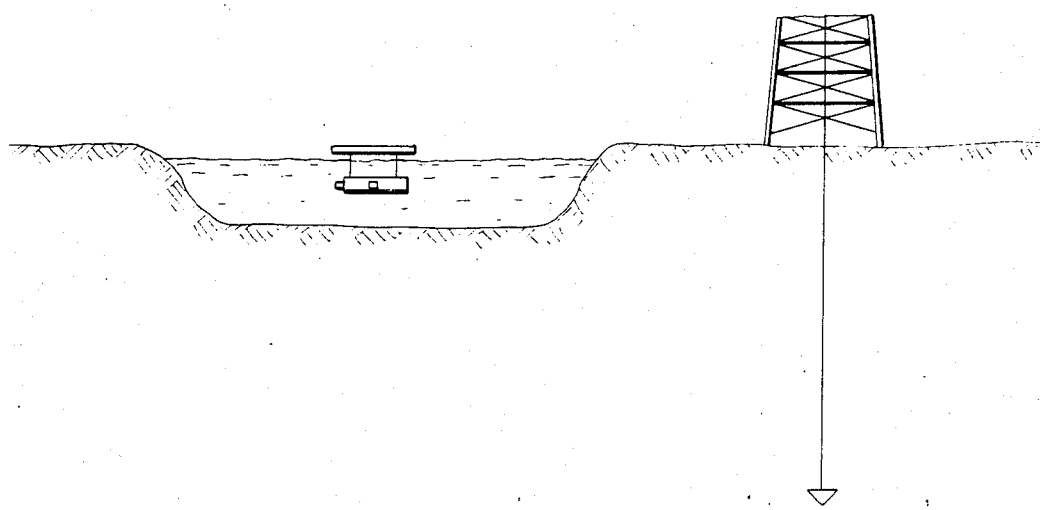
FIG. 6 is a representation of a compressed gas gun in a water or mud pit at a drill site.

A typical compressed gas gun with exhaust ports symmetrically about its periphery is illustrated at FIG. 1. During seismic operations, compressed gas can be released from the gas gun illustrated in FIG. 1 through means such as exhaust ports 10, 11, 13 and 15 to create an acoustic pulse in the water. Such exhaust ports are usually evenly distributed about the periphery of a typical cylindrical compressed gas gun housing 12. This allows release of gas symmetrically about the periphery of the compressed gas gun in a plane perpendicular to the longitudinal axis of the gun. Fastening means 14 are attached to the housing 12 and are used to connect the compressed gas gun to a marine support structure such as a boat, barge, buoy, float, dock, pier or wharf to support the gun in the water. FIG. 2 is illustrative of a shallow water arrangement of a compressed gas gun employing a barge and suspending the gun by cables from the barge. A typical use of an underwater acoustic source in a water pit for onshore seismic exploration is illustrated at FIG. 6.

Figure 3:
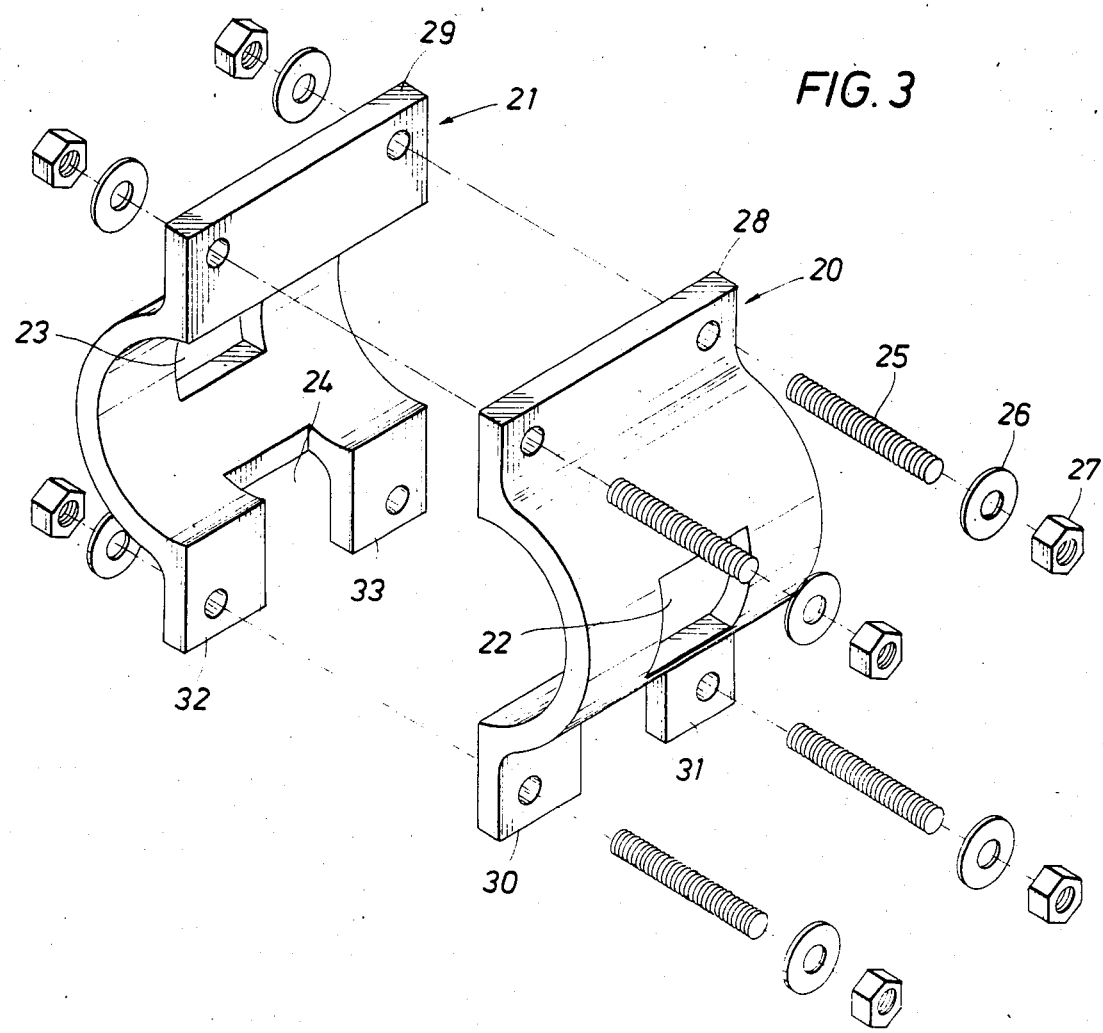
FIG. 3 is an embodiment of the port blind-off device of the current invention.
Figure 4:
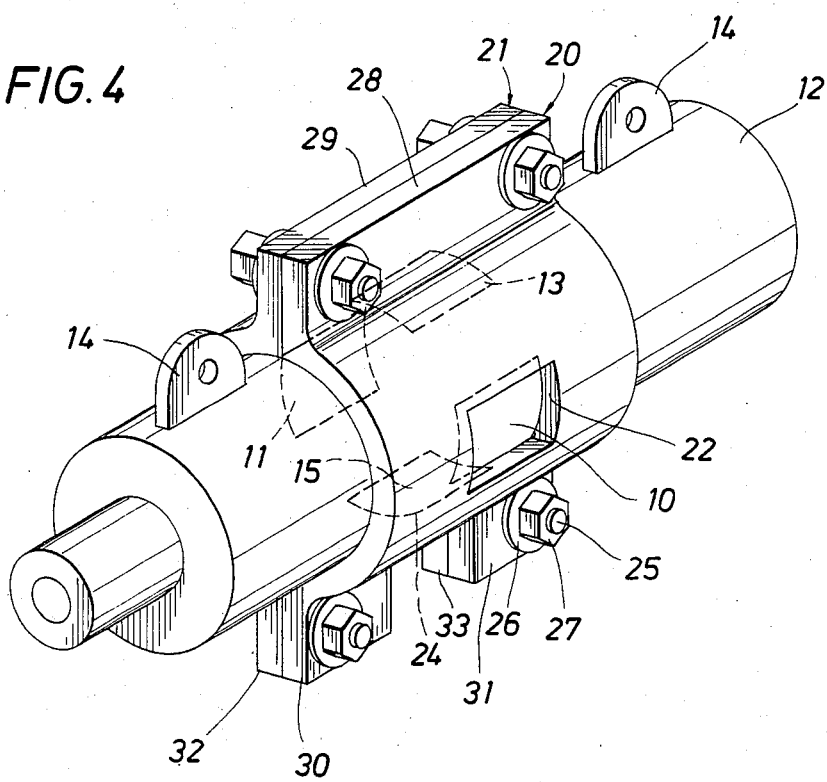
FIG. 4 is a typical compressed gas gun with a blind-off device of the current invention installed.

FIG. 3 illustrates an unassembled exhaust port device capable of modifying certain commercially available compressed gas guns for use in shallow water in accordance with the current invention. The particular device illustrated in FIG. 3 is designed specifically to block the uppermost port of a PAR ® air gun available from Bolt Technology Inc., Norwalk, Conn. In FIG. 3, half-collars 20 and 21 are capable of being attached to the air gun by joining upper flanges 28 and 29 and lower flanges 30, 31, 32 and 33, by means of threaded members 25, washers 26 and nuts 27. Note openings 22, 23 and 24 in FIGS. 3 and 4 which will allow gas release in three directions after the exhaust port blind-off device is installed on an air gun. An exhaust port blind-off device, as installed on an air gun, is schematically illustrated in FIG. 4. In FIG. 4, fastening means 14 are attached to the gun so that the port of the gun which has been blocked by means of a blind-off device or collar 20 and 21 (similar to the device of FIG. 3) which has been attached to the gun housing 12 is oriented upward toward the atmosphere-water interface. However, exhaust ports 10 and 11 which are horizontal and port 15 which is downward remain open. Fastening means 14 allow the modified apparatus to be suspended off a marine vessel as illustrated at FIG. 2 or in a water pit as illustrated at FIG. 6.

Figure 5:
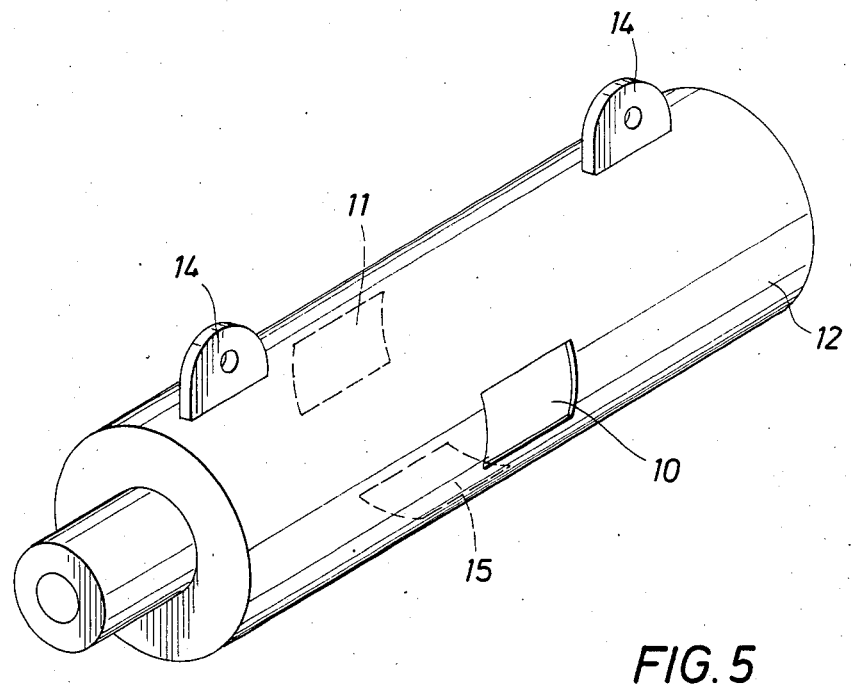
FIG. 5 is an isometric drawing of a typical compressed gas gun designed without an exhaust port on the upper side.

In the alternative, a device such as that illustrated at FIG. 5 may be specifically built for shallow water use. In FIG. 5, a blind-off device is not necessary since there are no exhaust ports in the compressed gas seismic apparatus housing 12 which would expel gas in an upward direction. The only exhaust ports open are those exhaust ports 10 and 11 which expel gas horizontally and exhaust port 15 which expels gas downward when the compressed gas apparatus is connected by fastening means 14 to a marine vessel or structure in shallow water similar to the configurations in FIGS. 2 and 6.

The advantages of the invention were demonstrated by several tests which are discussed below. In the first set of tests, a 120 cubic inch compressed air gun with 2,000 psi source pressure was used to demonstrate the effect of shallow water on air gun response. First, an unmodified, commercially available PAR ® air gun available from Bolt Technology Inc. was fired at four different depths (1 ft., 2 ft., 3 ft., 4 ft.) in 4 foot water. The acoustic response was measured by a hydrophone and a buried geophone. The test results in terms of maximum peak hydrophone pressure and maximum geophone output are contained in Table 1. Second, the same commercially available air gun was fitted with the port blind-off device of the current invention. The previous tests were repeated in 4 foot water at four depth intervals (1 ft., 2 ft., 3 ft., 4 ft.). The acoustic response of the firings from the modified air gun were measured with a hydrophone and a buried geophone. These results are also contained in Table 1.

Blow-outs were substantially reduced in test firings using a modified air gun. Comparing the acoustic response of a modified air gun and an unmodified air gun, Table 1 shows an increase in acoustic response when an air gun modified in light of the current invention is used in shallow water. Surprisingly, the maximum peak hydrophone pressure was substantially higher for a modified air gun fired in 4 foot deep water than for an unmodified air gun. Also, maximum geophone output was either improved or unchanged by the blow-out reduction device of the current invention.

TABLE 1

| | Maximum Peak Hydrophone Pressure (Bar-meters) | | Maximum Output of a 1000' Buried Geophone (Volts with 78 db of gain) | |
|---|---|---|---|---|
| Air Gun Depth (Feet) | All Exhaust Ports Open | Upper Exhaust Ports Blocked | All Exhaust Ports Open | Upper Exhaust Ports Blocked |
| 1 | 0.10 B-m | 0.22 B-m | 5.0 | 7.5 |
| 2 | 0.28 B-m | 0.71 B-m | 8.0 | 10.0 |
| 3 | 1.12 B-m | 1.44 B-m | 10.0 | 10.0 |
| 4 | 1.14 B-m | 1.84 B-m | 10.0 | 10.0 |

A second series of tests using a 120 cubic inch PAR ® air gun, 2,000 psi source pressure was conducted in water 8 feet deep. An unmodifed air gun was fired at five different depths (1 ft., 2 ft., 3 ft., 4 ft., 6 ft.). The acoustic response was again measured by a hydrophone and a buried geophone. The air gun was then modified with a device similar to that illustrated at FIGS. 2 and 3. The air gun modified to blind-off the upper port was fired at five different depths (1 ft., 2 ft., 3 ft., 4 ft., 6 ft.). Again, blow-outs were reduced in the tests using a modified air gun. The acoustic responses of these tests are contained in Table 2.

A comparison of the acoustic response from an unmodified air gun and that from a modified air gun in 8 foot deep water shows a substantially unchanged or increased response as measured by hydrophone pressure until the 6 foot depth. At the 6 foot depth, the reduction in response is minimal. Referring to the response as measured by the geophone, the modified device shows a response which is an improvement over the response from the unmodified device at a 1 foot depth. At depths beyond 1 foot in the 8 foot deep water, responses are substantially equivalent. However, blow-outs were reduced in tests using the air gun modified in accordance with the current invention.

A comparison of use of the modified air gun in 4 foot deep water as contained in Table 1 and 8 foot deep water as contained in Table 2 points out that the modified air gun is particularly well suited for obtaining maximum acoustic response in shallow water.

TABLE 2

| | Maximum Peak Hydrophone Pressure (Bar-meters) | | Maximum Output of a 1000' Buried Geophone (Volts with 78 db) | |
|---|---|---|---|---|
| Air Gun Depth (Feet) | All Exhaust Ports Open | Upper Exhaust Ports Blocked | All Exhaust Ports Open | Upper Exhaust Ports Blocked |
| 1 | 0.14 B-m | 0.19 B-m | 2.8 | 3.2 |
| 2 | 0.68 B-m | 0.75 B-m | 4.8 | 4.6 |
| 3 | 1.78 B-m | 1.76 B-m | 6.1 | 6.0 |
| 4 | 2.26 B-m | 2.32 B-m | 10.0 | 10.0 |
| 6 | 2.38 B-m | 2.26 B-m | 10.0 | 10.0 |

Thus the present invention is an underwater seismic energy source having a housing capable of holding compressed gas, attachment means fastened to the housing to position the apparatus in a selected orientation in the water and compressed gas exhaust ports positioned in the housing so when the housing is in the selected orientation, the compressed gas escapes through exhaust ports other than substantially upward. In a preferred embodiment, a commercially available compressed gas gun is modified by blinding off the uppermost exhaust ports.

Various modifications and alterations in the practice of this invention will be apparent to those skilled in the art without departing from the scope and spirit of this invention. Although the invention was described in connection with specific preferred embodiments, it should be understood that the invention as claimed should not be unduly limited to such specific embodiments.

What is claimed is:

1. An apparatus for generating a shock wave in water comprising:
   (a) an elongated housing having a longitudinal axis and adapted to releasably contain compressed gas;
   (b) attachment means fastened to said housing by which said apparatus may be positioned in said water such that the longitudinal axis is substantially horizontal; and
   (c) exhaust means positioned in said housing so that when said housing is positioned in the water such that the housing's longitudinal axis is substantially horizontal, said compressed gas escapes through said exhaust means only in directions other than substantially upward.

2. The apparatus of claim 1 wherein said housing is cylindrical.

3. The apparatus of claim 1 wherein said exhaust means includes exhaust ports asymmetrically distributed about the longitudinal axis of said apparatus.

4. The apparatus of claim 2 wherein said exhaust means includes two exhaust ports capable of releasing gas substantially horizontally and one exhaust port capable of releasing gas substantially downward.

5. An apparatus for generating a shock wave in water comprising:
   (a) an elongated housing having a longitudinal axis and adapted to releasably contain compressed gas;
   (b) attachment means fastened to said housing by which sid apparatus may be positioned in said water in an orientation such that the longitudinal axis is substantially horizontal;
   (c) first exhaust means positioned in said housing so that when said housing is oriented in the water such that the longitudinal axis is substantially horizontal, said first exhaust means is directed substantially upward;
   (d) second exhaust means positioned in said housing so that when said housing is oriented in the water such that the longitudinal axis is substantially horizontal, said second exhaust means is directed other than substantially upward; and
   (e) a collar comprised of a first half-collar and a second half-collar, said first half-collar contiguous with at least a first portion of the outer surface of said housing and said second half-collar contiguous with at least a second portion of the outer surface of said housing, said first half-collar and said second half-collar being mated about said housing and having a configuration so that said first exhaust means is substantially blocked and said second exhaust means is substantially open.

6. An apparatus for generating a shock wave in water comprising:
   (a) an elongated housing adapted to contain compressed gas, said housng having a longitudinal axis;

(b) attachment means fastened to the upper portion of said housing in a manner so that the housing may be suspended from the attachment means in the water such that the longitudinal axis of said housing is substantially horizontal; and (c) exhaust means positioned in said housing so that when the housing is suspended in the water with its longitudinal axis substantially horizontal, the exhaust means permits gas to escape from within the housing only in directions other than substantially upward.

7. The apparatus of claim 6 wherein said exhaust means includes exhaust ports asymmetrically distributed about the longitudinal axis.

8. The apparatus of claim 6 wherein said exhaust means includes two exhaust ports positioned on opposite sides of said housing and one exhaust port positioned on the lower side of said housing.

9. A device for reducing above-surface blow-outs from an elongated compressed gas gun during release of compressed gas from said gun, when the gun is positioned in water so that the longitudinal axis of said gun lies in a plane substantially parallel to the atmosphere-water interface, said gun having a housing including an outer surface and at least one upward exhaust means and at least one other than upward exhaust means, said device comprising a first half-collar adapted to be contiguous with at least a first portion of the outer surface of said housing and a second half-collar adapted to be contiguous with at least a second portion of the outer surface of said housing, said first half-collar and said second half-collar adapted to be mated about said housing so that said upward exhaust means is blocked while at least one other than upward exhaust means remains open.

10. The device of claim 9 wherein said first half-collar has at least one upper flange and at least one lower flange and said second half-collar has at least one upper flange and at least one lower flange, said flanges oriented so that upon mating said half-collars about said housing, said upper flanges are mated along a line substantially parallel to said longitudinal axis of said gas gun and said lower flanges are mated along another line substantially parallel to said longitudinal axis of said gas gun.

11. The device of claim 10 wherein each said flange is adapted to have at least one bolt hole.

12. The device of claim 11 wherein said first and second half-collars are mated by means of bolts through said bolt holes.

13. A device for modifying an elongated compressed gas gun, said gun having (1) a substantially elongated housing adapted to contain compressed gas, (2) attachment means fastened to the upper side of said housing in a manner so that the housing may be suspended from the attachment means in water such that the longitudinal axis of said housing is substantially horizontal, (3) first exhaust means positioned on said upper side of said housing, and (4) second exhaust means positioned other than on said upper side of said housing, said device comprising a first half-collar adapted to be contiguous with at least a first portion of the outer surface of said housing and a second half-collar adapted to be contiguous with at least a second portion of the outer surface of said housing, said first half-collar and said second half-collar adapted to be mated about said housing so that said first exhaust means is blocked while said second exhaust means remains open.

14. The device of claim 13 wherein said first half-collar has at least one upper flange and at least one lower flange and said second half-collar has at least one upper flange and at least one lower flange, said flanges oriented so that upon mating said half-collars about said housing, said upper flanges are mated along a line substantially parallel to said longitudinal axis of said gas gun and said lower flanges are mated along another line substantially parallel to said longitudinal axis of said gas gun.

15. The device of claim 14 wherein each said flange is adapted to have at least one bolt hole.

16. The device of claim 15 wherein said first and second half-collars are mated by means of bolts through said bolt holes.

17. A method for producing a shock wave in water while reducing above-surface blow-outs during release of compressed gas from a compressed gas gun comprising an elongated housing having attachment means fastened thereon so that the gun may be suspended from the attachment means in the water so that the gun's longitudinal axis is substantially horizontal, said housing having first exhaust means and second exhaust means therein so that, when said housing is in its suspended position, said first exhaust means will face upward and said second exhaust means will face other than upward, said method comprising:

(a) blocking said first exhaust means;
(b) suspending said gun in water with its longitudinal axis substantially horizontal; and
(c) releasing said compressed gas through said second exhaust means.

* * * * *